(12) United States Patent
Yamamoto et al.

(10) Patent No.: US 9,996,076 B2
(45) Date of Patent: Jun. 12, 2018

(54) CONTROL APPARATUS, CONTROL PROGRAM, AND RECORDING MEDIUM

(71) Applicant: OMRON Corporation, Kyoto (JP)

(72) Inventors: Eiji Yamamoto, Kyoto (JP); Daisuke Matsunaga, Otsu (JP); Tomonori Shimamura, Otsu (JP); Yoshimi Kamitani, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days. days.

(21) Appl. No.: 15/382,758

(22) Filed: Dec. 19, 2016

(65) Prior Publication Data
US 2017/0248938 A1 Aug. 31, 2017

(30) Foreign Application Priority Data
Feb. 26, 2016 (JP) .................................. 2016-036459

(51) Int. Cl.
G05B 19/29 (2006.01)
G05B 19/416 (2006.01)

(52) U.S. Cl.
CPC .. *G05B 19/416* (2013.01); *G05B 2219/34013* (2013.01); *G05B 2219/36495* (2013.01)

(58) Field of Classification Search
CPC . G02B 7/04; G02B 7/08; G02B 23/16; G02B 7/1827; H02N 2/142; H02P 8/08; H02P 23/24; B66B 1/285; B66B 1/32; B66B 1/3492; E05F 15/632; E05F 15/643; E05F 15/40; E05Y 2900/132; E05Y 2201/648
See application file for complete search history.

(56) References Cited

U.S. PATENT DOCUMENTS 3,921,610 A * 11/1975 Hartig ..................... F02P 5/15
 123/406.63
4,046,229 A * 9/1977 Kernick ................... B66B 1/32
 187/293
(Continued)

FOREIGN PATENT DOCUMENTS

JP H05-150808 6/1993
JP H0916261 1/1997

OTHER PUBLICATIONS

"Search Report of Europe Counterpart Application", dated Nov. 7, 2017, p. 1-p. 9, in which the listed references were cited.

*Primary Examiner* — Karen Masih
(74) *Attorney, Agent, or Firm* — JCIPRNET

(57) ABSTRACT

The present invention uses a simple structure to precisely control a position of a rotator. A controller (1) sends a pulse for controlling rotation of a work (34) to a servo driver (2), and the work (34) is rotated by a motor (31) according to a reduction ratio as prescribed of a decelerator in which the motor (31) is driven by the servo driver (2) using a pulse quantity of the pulse for indicating an instruction position. The controller (1) includes a counting range determining part (132), and the counting range determining part (132) determines a counting range of an instruction position counter (21a) for counting the pulse quantity. The counting range determining part (132) multiples a prescribed pulse quantity of each turn of the motor (31) by a reciprocal of the reduction ratio and a correction value, and determines the correction value which enables a multiplication result to be an integer.

8 Claims, 6 Drawing Sheets

(56) References Cited

U.S. PATENT DOCUMENTS

| | | | | |
|---|---|---|---|---|
| 4,081,732 A * | 3/1978 | Aoyama | ............... | G05B 19/238 318/601 |
| 4,102,436 A * | 7/1978 | Kernick | ................. | B66B 1/285 187/293 |
| 4,150,734 A * | 4/1979 | Ohira | .................... | B66B 1/3492 187/296 |
| 4,311,945 A * | 1/1982 | Aoyama | ............... | G05B 19/416 318/561 |
| 4,350,065 A * | 9/1982 | Hayashi | ................. | B23D 25/04 700/160 |
| 4,404,626 A * | 9/1983 | Aoyama | ............... | G05B 19/416 318/561 |
| 4,449,078 A * | 5/1984 | Ogishi | ................ | G05B 19/416 318/102 |
| 4,529,920 A * | 7/1985 | Yoshida | ................. | H02P 23/24 318/466 |
| 4,775,823 A * | 10/1988 | Yoshida | ............. | G05B 19/0415 318/266 |
| 5,016,126 A * | 5/1991 | Horie | .................. | G11B 5/5552 360/78.07 |
| 5,770,934 A * | 6/1998 | Theile | .................. | H02H 7/0851 318/466 |
| 6,598,859 B1 * | 7/2003 | Kureck | ................... | B66C 13/23 254/292 |
| 6,956,339 B1 * | 10/2005 | Kureck | ................... | B66C 13/23 254/292 |
| 6,960,853 B2 * | 11/2005 | Endo | ........................ | G02B 7/04 310/80 |
| 7,015,622 B2 * | 3/2006 | Endo | ....................... | G02B 7/04 310/317 |
| 7,228,253 B2 * | 6/2007 | Chen | .................... | G02B 7/1827 318/11 |
| 8,693,920 B2 * | 4/2014 | Birumachi | ......... | G03G 15/5004 399/167 |
| 2004/0150357 A1 * | 8/2004 | Endo | ........................ | G02B 7/04 318/114 |
| 2004/0197126 A1 * | 10/2004 | Igarashi | ............... | B23Q 35/128 400/582 |
| 2005/0179411 A1 * | 8/2005 | Endo | ........................ | G02B 7/04 318/119 |
| 2006/0052974 A1 * | 3/2006 | Chen | .................... | G02B 23/16 702/150 |
| 2007/0244955 A1 | 10/2007 | Wang et al. | | |
| 2012/0003010 A1 * | 1/2012 | Birumachi | ......... | G03G 15/5004 399/167 |

\* cited by examiner (a) Work position [°]

(b) Pulse position [pulse quantity]

(a) Work position [°]

(b) Work position [°]

(c) Pulse position [pulse quantity]

CONTROL APPARATUS, CONTROL PROGRAM, AND RECORDING MEDIUM

CROSS-REFERENCE TO RELATED APPLICATION

This application claims the priority benefit of Japan application serial no. 2016-036459, filed on Feb. 26, 2016. The entirety of the above-mentioned patent application is hereby incorporated by reference herein and made a part of this specification.

BACKGROUND OF THE INVENTION

1. Field of the Invention

The present invention generally relates to a control apparatus controlling rotation of a rotator.

2. Description of Related Art

A controller performing motion control uses a target value (position, speed, torque and the like) of an instruction in a user program to perform, at regular periods, output of an instruction position of a control object such as a motor and information obtaining from the control object required for implementing required actions. The controller, as disclosed in patent document 1, converts an instruction movement amount of the rotator to a unit of a pulse quantity processed by a servo driver.

For example, when the rotator is driven in a system which uses the motor to rotate the rotator such as a table, during manufacturing of the user program, an instruction position indicating a rotator position is set by using an angle as a unit. Correspondingly, a driver of the motor processes an instruction value by using a pulse as a unit. Therefore, the unit of the instruction position needs to be converted from an angle to a pulse quantity. For example, when the motor rotates for a turn from 0° to 360° and returns to 0°, in a coordinate system repeatedly rotating from 0°, a turn (360°) rotated by the motor is converted into a prescribed pulse quantity.

PRIOR ART DOCUMENTS

Patent Documents

Patent document 1: JP Patent Publication No. H05-150808 gazette (disclosed on Jun. 18, 1993)

SUMMARY OF THE INVENTION

Problems to be Resolved by the Present Invention

Moreover, in a driver, a deviation counter is used to control a motor based on a deviation pulse between an instruction position and a current position. In order to obtain the deviation pulse, pulses indicating the instruction position and pulses indicating the current position need to be counted. A ring counter is often used to count. When a rotator starts rotating, the ring counter starts counting pulses of the instruction position from a counting lower limit value. When the rotator rotates for a turn and a pulse quantity of the instruction position reaches a counting upper limit value, the ring counter starts counting again from a counting lower limit value.

When a decelerator of a gear is used to perform deceleration drive on a work as the rotator, according to a reduction ratio of the decelerator, the system converts a movement amount of each turn rotated by the work into a pulse unit, which sometimes is a non-integer. At this time, because the instruction position sent by the driver to the controller is an integer value, when the work rotates, a mantissa of a small numerical part is generated. When the counting of the ringer counter is switched from the counting upper limit value to the lower limit value, the mantissa is removed at a controller side, and during repeated rotation of the work, a deviation is generated between numerical rotations and actual rotations.

For example, when the motor rotates for 5 turns and the work rotates for 3 turns, the reduction ratio of the decelerator is 3/5. At this time, a quantity P of conversion pulses of the work with the reduction ratio rotating for a turn is shown in the following formula, and is obtained by multiplying a prescribed pulse quantity (10000 pulses) for a turn rotated by the motor by a reciprocal of the reduction ratio.

$$P=10000\times(5/3)=16666.66666\ldots$$

Because the quantity P of the conversion pulses of the instruction position needs to be an integer, when the small numerical value (0.66666 . . . ) is removed, a pulse position using the pulse quantity to indicate a rotation position of the work is shown in FIG. 7(c). When the work rotates for a turn, the quantity reaches the counting upper limit value of the ring counter, that is, 16666, the quantity is restored to a counting lower limit value 0. Therefore, a position of the work (the work position) actually driven is shown in FIG. 7(a). Correspondingly, as shown in FIG. 7(b), a deviation D of the work position is generated based on the quantity P of the conversion pulses which removes the small numerical value. The deviation D is accumulated so as to be amplified during repeated rotations.

As a method for correcting the deviation D, the method includes accumulating and monitoring a quantity of mantissa pulses (which is 0.6666 . . . in this case) of a decimal of each rotation, and output a correction value at a time point when an accumulative value of the quantity of mantissa pulses is at least 1, so as to correct the quantity P of conversion pulses to eliminate the accumulative value of the quantity of mantissa pulses. However, the method may generate the following bad condition: a speed is not continuous when the correction value is output, or a monitored position is inconsistent with a quantity of output pulses. Moreover, in order to avoid this bad condition, a structure of an operation part is complex.

The present invention is completed based on the problem, and is directed to precisely control the position of the rotator by using a simple structure.

Manner for Solving the Problems

To solve the problem, the control apparatus of the present invention sends a pulse for controlling rotation of a rotator to a driver, where the rotator uses is rotated by a motor according to a reduction ratio as prescribed of a decelerator in which the motor is driven by the driver using a pulse quantity of the pulse for indicating an instruction position. The control apparatus includes a counting range determining part, configured to determine a counting range of a counter for counting the pulse quantity, where the counting range determining part multiples a prescribed pulse quantity for each rotation turn of the motor by a reciprocal of the reduction ratio and a correction value, and determines the correction value which enables a multiplication result to be an integer.

According to the structure, the pulse quantity obtained by multiplying the prescribed pulse quantity by the reciprocal of the reduction ratio and the correction value is an integer.

Therefore, as that in a past system, a numerical value error is not generated when a counting range is switched from an upper limit value to a lower limit value. Therefore, an accumulation of the error is not accumulated on a current position. Therefore, a position of the rotator actually driven is consistent with a position of the work that is set according to the instruction position. Moreover, not as that of a past controller, a management correction processing is not required to be performed on a quantity of mantissa pulses of the numerical value.

In the control apparatus, the decelerator is a gear pair with the reduction ratio being N/M, the gear pair enabling the rotator to rotate for N (N is an integer) turns relative to the motor rotating for M (M is an integer) turns; and the counting range determining part determines a rotational speed N of the rotator as the correction value.

According to the structure, a process for determining the correction value is simple.

In the control apparatus, the counting range determining part also uses a positive integer as a multiplier, multiplies the multiplier sequentially increasing from 1 by a multiplicative value of the prescribed pulse quantity and the reciprocal of the reduction ratio, and determines the multiplier multiplying the multiplicative value as the correction value when a multiplication result is an integer.

The control apparatus of the present invention may also be implemented by using a computer. At this time, a control program of the control apparatus that enables the computer as parts (software elements) of the control apparatus and that uses the computer to implement the control apparatus, and a computer readable recoding medium recording the control program also belong to a scope of the present invention.

Effects of the Present Invention

The present invention has the following effect: a simple structure can be used to precisely control a position of a rotator.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6 is a diagram of unit conversion actions of the unit conversion part, wherein FIG. 6(a) is a diagram of a position of a work 34, and FIG. 6(b) is a diagram of a pulse position on which the position of the work 34 is converted into a pulse.

DESCRIPTION OF THE EMBODIMENTS

Figure 1:
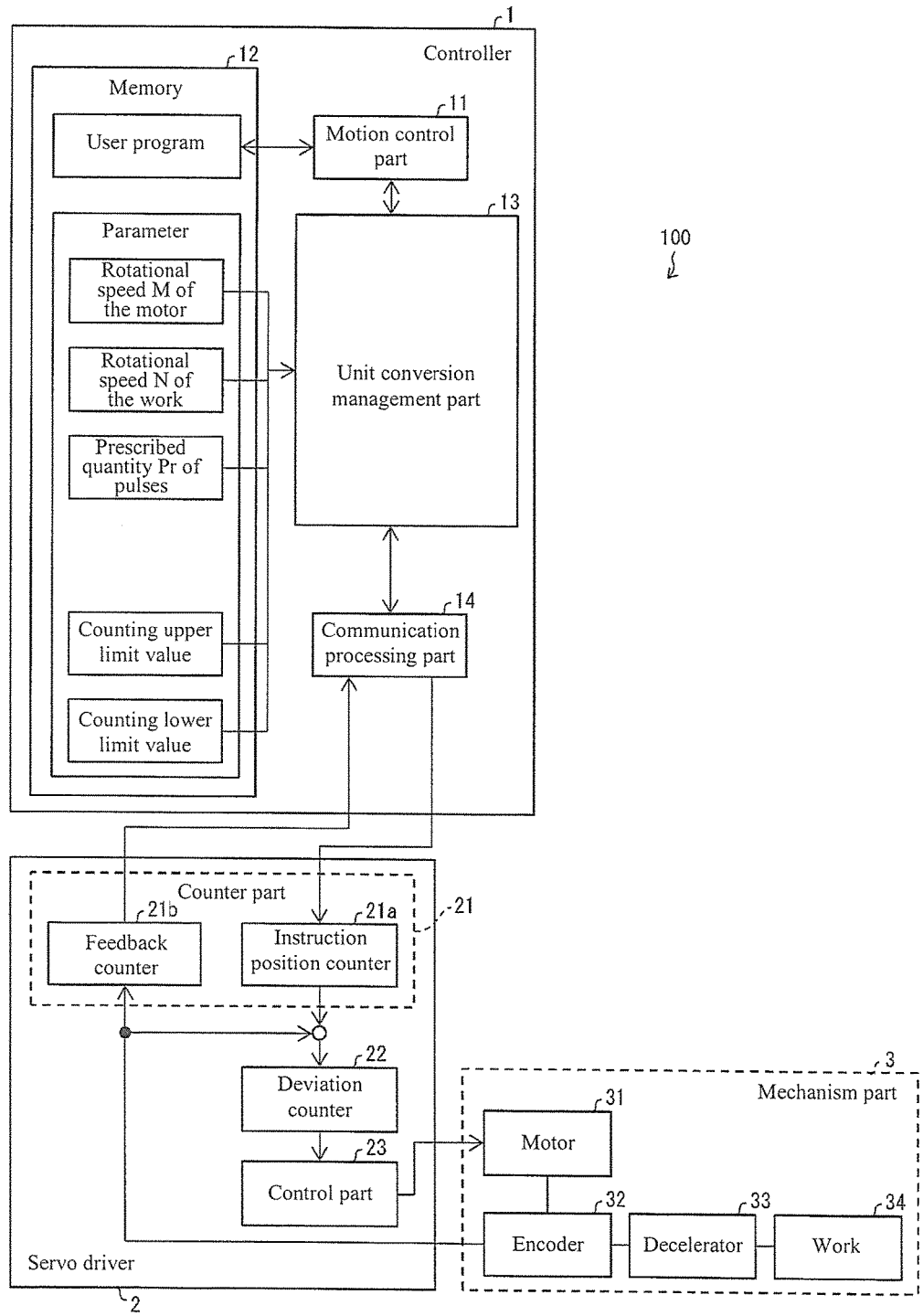
FIG. 1 is block diagram of a general structure of a control system of implementation manner 1 of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 to FIG. 6(a) and FIG. 6(b) are used to illustrate an implementation manner of the present invention as follows.

[The Structure of a Control System 100]

Figure 2:
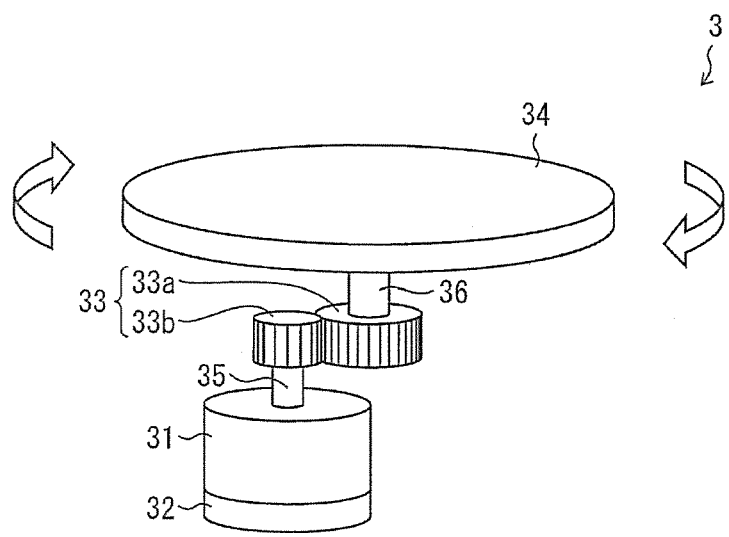
FIG. 2 is a stereogram of a structure of a mechanism part in the control system.
Figure 3:
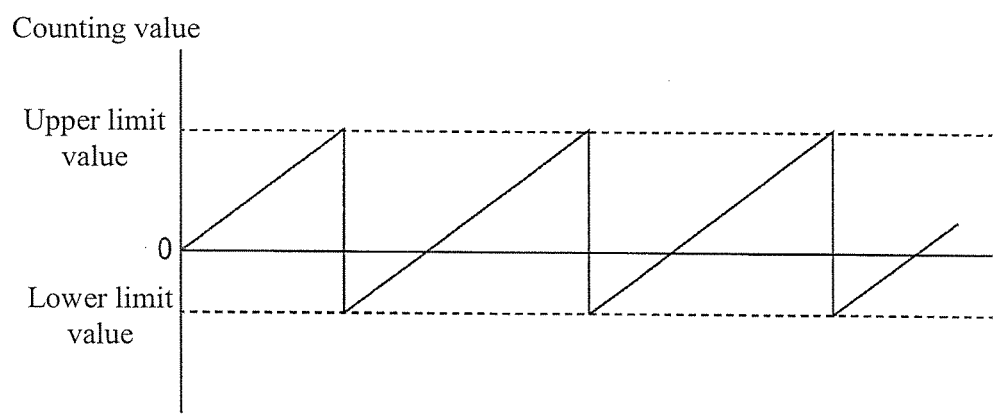
FIG. 3 is a diagram of an action of a counter part of a servo driver in the control system.
Figure 4:
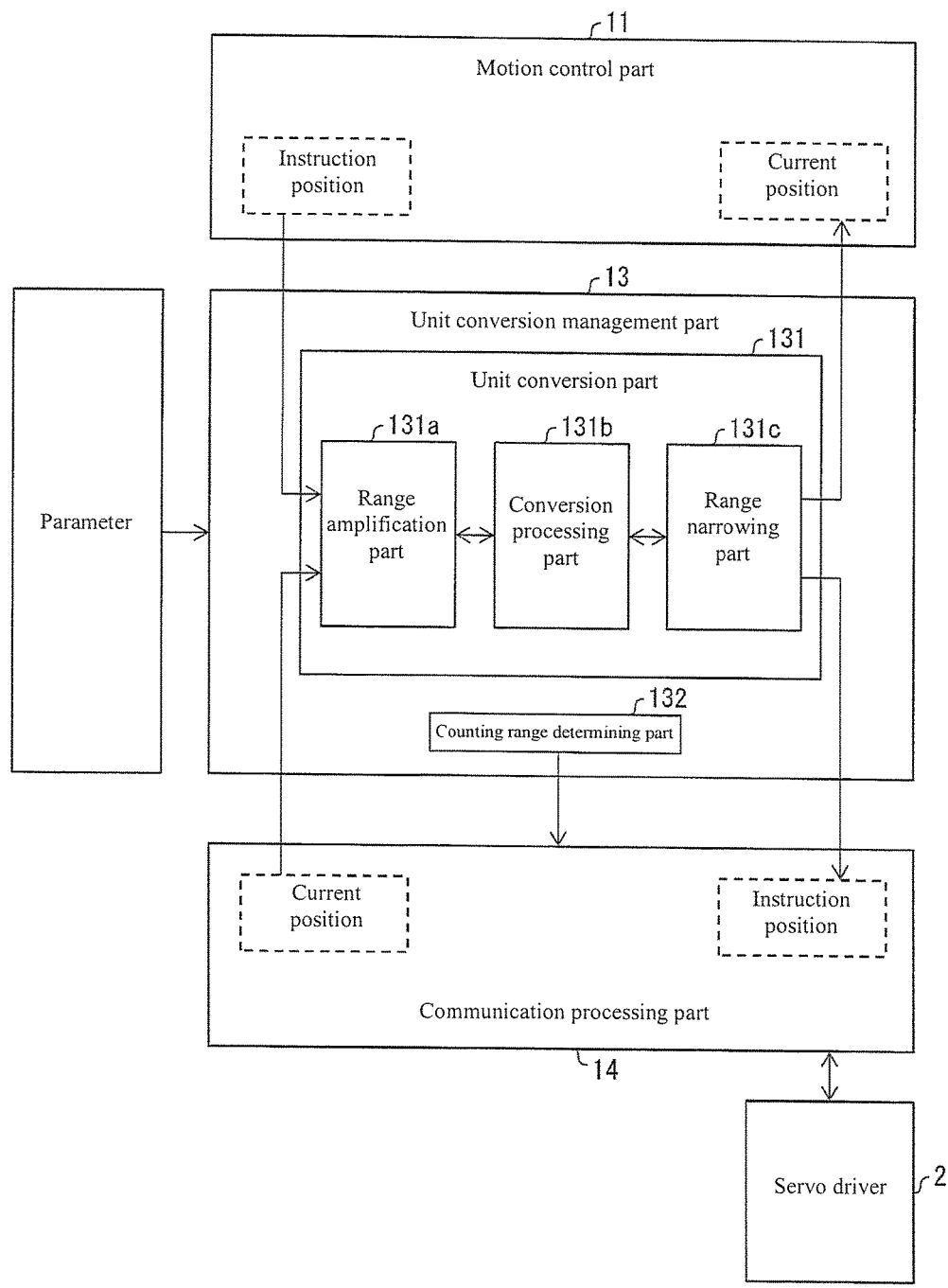
FIG. 4 is a block diagram of a structure of a unit conversion part of a controller in the control system.

FIG. 1 is block diagram of a general structure of a control system 100 of implementation manner 1. FIG. 2 is a stereogram of a structure of a mechanism part 3 in the control system. FIG. 3 is a diagram of an action of a counter part 21 of a servo driver 2 in the control system 100. FIG. 4 is a block diagram of a structure of a unit conversion part 131 of a controller 1 in the control system 100.

As shown in FIG. 1, the control system 100 includes the controller 1, the servo driver 2 (driver), and the mechanism part 3.

The mechanism part 3 is a control object of the controller 1, and includes a motor 31, a rotary encoder 32, a decelerator 33, and a work 34 as a rotator. The motor 31 such as a servo motor drives the work 34 to rotate. Moreover, as shown in FIG. 2, the motor 31 is integrally provided with a rotary encoder 32 configured for detecting a rotation angle and a rotation angular velocity. The rotary encoder 32 outputs periodical pulse signals along with rotation of the motor 31.

The decelerator 33 is a gear pair including a work side gear 33a (a first gear) of a rotation shaft 36 installed on the work 34 and a motor side gear 33b (a second gear) of a rotation shaft 35 installed on the motor 31, and the work side gear 33a and the motor side gear 33b are engaged. The driving of the work 34 by the motor 31 is intervened by the decelerator 33, so that when the motor 31 rotates for M turns and the work 34 rotates for N turns, a prescribed reduction ratio of the decelerator 33 is represented by N/M (M: a positive integer, N: a positive integer less than M).

The servo driver 2 has a counter part 21, a deviation counter 22, and a control part 23. Moreover, the servo driver 2 receives an instruction position sent by a communication processing part 14, and sends information such as a feedback position detected based on an output of the rotary encoder 32 to the controller 1.

The counter part 21 includes an instruction position counter 21a (counter) and a feedback counter 21b. The instruction position counter 21a counts a pulse quantity of an instruction position (an instruction value) provided by the controller 1 in a form of a pulse signal. The feedback counter 21b counts a pulse quantity of a feedback position (a current position) provided by the rotary encoder 32 in a form of a pulse signal. The counter part 21 is as shown in FIG. 3. When the pulse quantity is counted, an action of restoring an upper limit value to a lower limit value of a counting range is repeated. Therefore, a ring counter is included. In addition, for the counter part 21, a ring counter function of various counter functions included in a counter unit that is set independent of the servo driver 2 may also be used.

The deviation counter 22 counts a deviation between the instruction position counted by the counter part 21 and the current position, and provides the deviation to a control part 23.

The control part 23 controls rotation of the motor 31 so as to eliminate the deviation between the instruction position and the current position as a deviation pulse remained in the deviation counter 22. Specifically, as optimal drive energy corresponding to a status parameter (a rotation angle or a rotation angular velocity) of the motor 31, the control part 23 provides a torque so as to drive the motor 31. The control part 23 performs position control according to a feedback position (a rotation angle) of a pulse signal output by the rotary encoder 32 and an instruction value from the controller 1 as a position control function. Moreover, the control part 23 performs speed control according to a control pulse obtained as a position control result and a feedback speed (a rotation angular velocity) of a pulse signal output by the rotary encoder 32 as a speed control function. Moreover, the control part 23 performs torque control according to an input torque and an output torque (a feedback torque) as a torque control function.

The controller 1 is a control apparatus that generates an instruction position (an instruction value) used for motion control and provided by the servo driver 2, and includes a programmable logic controller (PLC). The controller 1 includes a motion control part 11, a memory 12, a unit conversion management part 13, and a communication processing part 14.

The motion control part 11 analyzes a motion control command included in a subsequent user program, and performs motion operation at regular periods based on an analysis result, so as to generate an instruction position provided by the servo driver 2. Moreover, the motion control part 11 determines, based on a deviation between the position of the motion control part 11 and the current position of the servo driver 2, whether the work 34 reaches the instruction position (in position (in position)).

The memory 12 is a storage apparatus that is set for storing user programs and parameters. The user programs are prescribed with a motion control command for prescribing actions of the work 34 and a condition for performing the motion control command, and are made by a user. The parameters are information used for prescribing actions of the work 34 and are set by the user. The parameters are used for determining a rotational speed M of the motor 31 with a reduction ratio, a rotational speed N of the work 34, a prescribed quantity Pr of pulses, a counting upper limit value, and a counting lower limit value.

The prescribed quantity Pr of pulses is a pulse quantity of fixed intervals allocated when the motor 31 rotates for a turn (a rotation range).

The counting upper limit value and the counting lower limit value indicate a rotation range of the work 34 designated by the user, and a unit system is also set by using a same unit (such as a rotation angle).

The unit conversion management part 13 converts a unit of an instruction value generated by the motion control part 11 into a unit processed in the servo driver 2, and manages a counting period of the counting part 21. Therefore, as shown in FIG. 4, the unit conversion management part 13 includes a unit conversion part 131 and a counting range determining part 132.

In order to convert units of the instruction position and the current position, the unit conversion part 131 includes a range amplification part 131*a*, a conversion processing part 131*b*, and a range narrowing part 131*c*.

The range amplification part 131*a* amplifies an angle range (an upper limit of the angle is 360°) of N turns rotated by the work 34 to N times (M[N]×360°) that of the range. Moreover, the range amplification part 131*a* amplifies a range (an upper limit of the prescribed pulse quantity is Pr) of a pulse quantity of M turns rotated by the motor 31 to M times (M×Pr) of that of the range. Here, M is the rotational speed of the motor 31, and N is the rotational speed of the work 34. Moreover, the range amplification part 131*a* converts the input instruction position into a corresponding value in an amplified angle range, and converts the current position into a corresponding value in an amplified range of the pulse quantity.

The conversion processing part 131*b* converts an instruction position of an angle converted by the range amplification part 131*a* into a corresponding value in an amplified range of the pulse quantity. Moreover, the conversion processing part 131*b* converts a current position of the pulse quantity converted by the range amplification part 131*a* into a corresponding value in an amplified angle range.

A range narrowing part 131*c* restores (narrows) an angle range amplified by the range amplification part 131*a* to a range before the amplification. Moreover, the range narrowing part 131*c* restores (narrows) a range of the pulse quantity amplified by the range amplification part 131*a* to a range before the amplification.

During initial processing, the counting range determining part 132 multiplies the prescribed quantity Pr of pulses by a reciprocal of the reduction ratio N/M, so as to calculate a range of a value obtained by counting, by the instruction position counter 21*a* and the feedback counter 21*b* of the counter part 21, the pulse quantity equivalent to an angle of a turn rotated by the work 34, as a conversion value (a multiplicative value). Moreover, during initial processing, the counting range determining part 132 determines a multiplier multiplying a conversion value when a result is an integer as a correction value, and multiplies a conversion value by the correction value so as to calculate a quantity Pc of conversion pulses. Here, the quantity Pc of conversion pulses is a pulse quantity equivalent to n (n: a positive integer) turns rotated by the work 34.

Specifically, the counting range determining part 132 determines the rotational speed N of the work 34 as a multiplier. Alternatively, the counting range determining part 132 may also use a positive integer as a multiplier, multiplies the multiplier sequentially increasing from 1 by a conversion value, and determines the multiplier multiplying the conversion value as the correction value when a multiplication result is an integer (the minimum integer is especially preferred).

The communication processing part 14 sends an instruction value on which unit conversion is performed by the unit conversion management part 13 to the servo driver 2 during each process data communication period by means of communications of process data objects (PDO). PDO communication is suitable for a situation in which real-time information exchange is performed at regular periods.

<Actions of the Controller 1>

Figure 5:
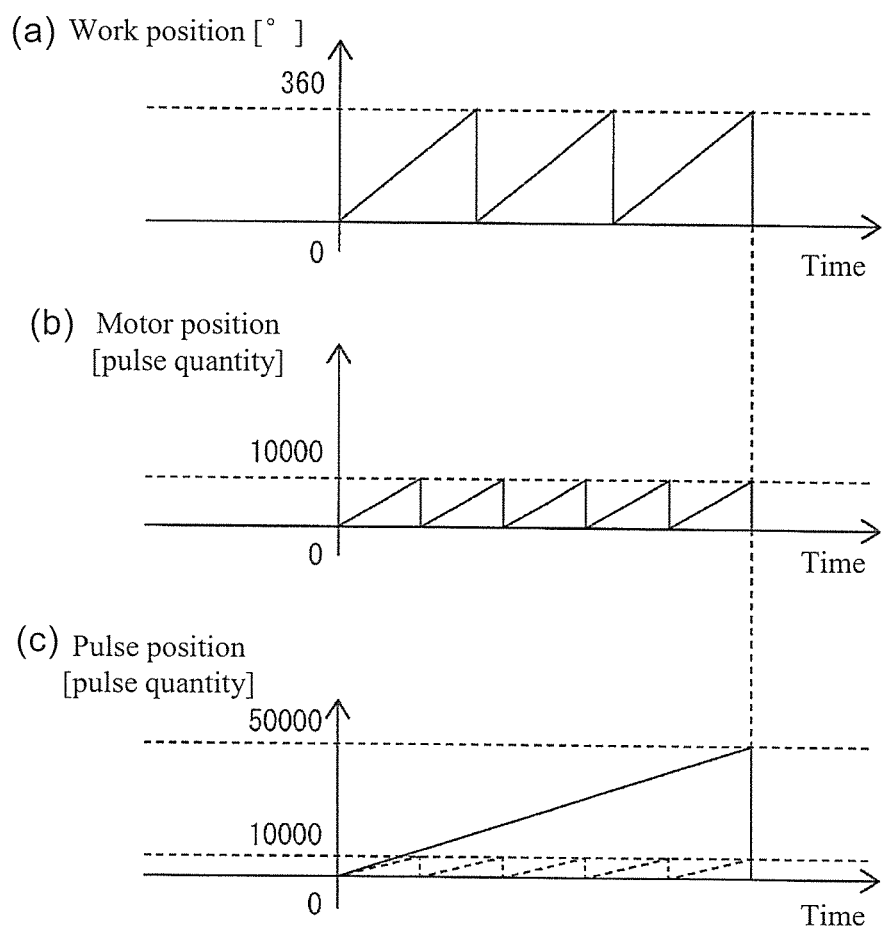
FIG. 5 is a respective diagram of relationships among a work position, a motor position, and a pulse position that are managed by the controller.
Figure 6:
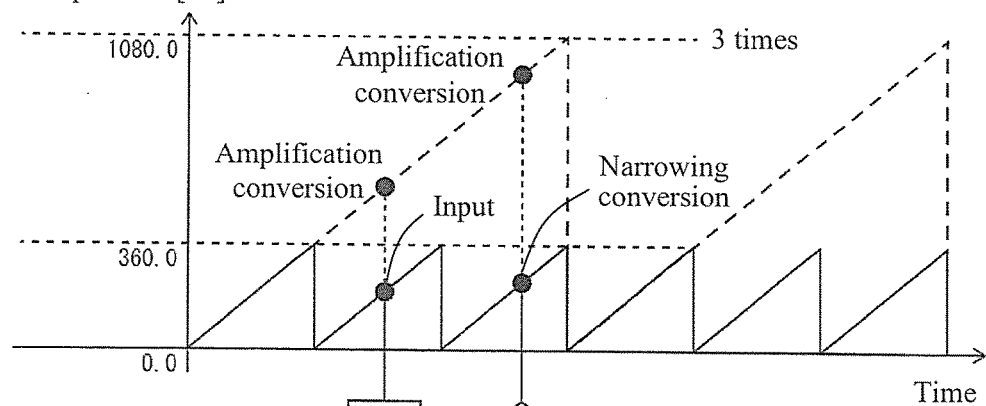
Figure 6:
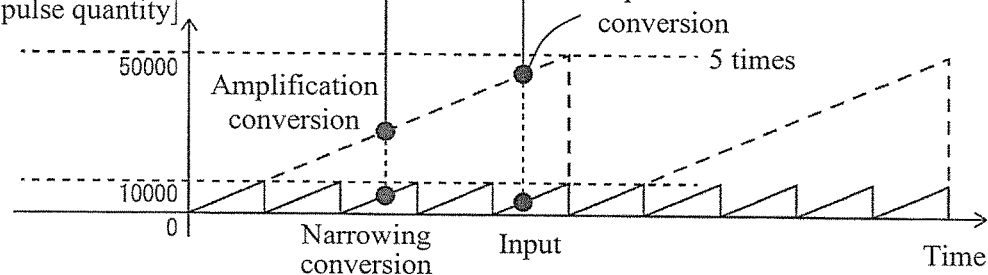
Figure 7:
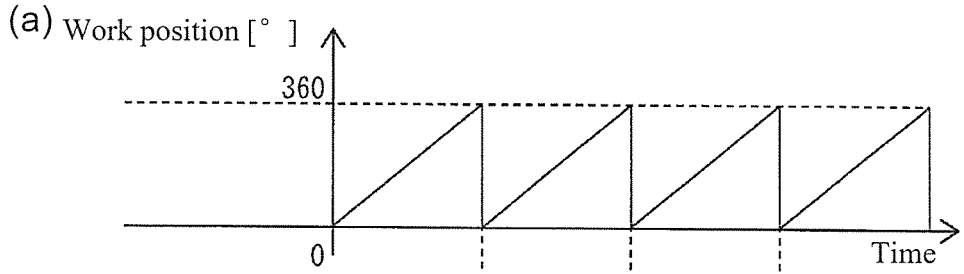
FIG. 7 is a respective diagram of relationships of an actual work position, a work position and a pulse position when a decimal point of the quantity of conversion pulses is removed.
Figure 7:
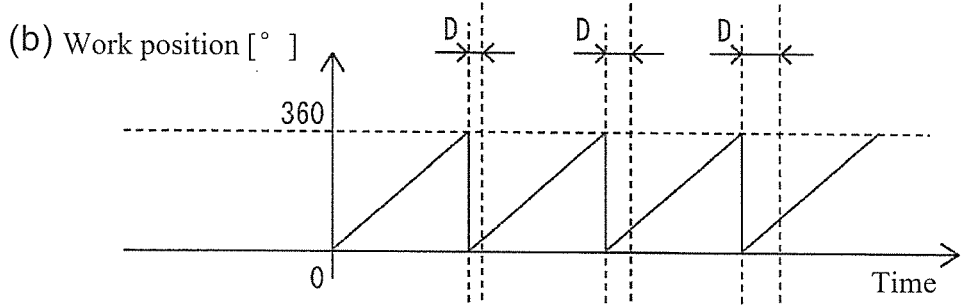
Figure 7:
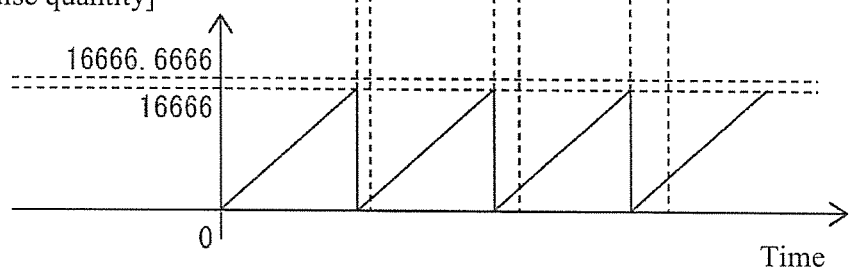

A unit conversion action of the controller 1 in the control system 100 composed by the foregoing manner is illustrated. FIG. 5(*a*) to FIG. 5(*c*) are respective diagrams of relationships among a work position, a motor position, and a pulse position that are managed by the controller. FIG. 6(*a*) and FIG. 6(*b*) are diagrams of unit conversion actions of a unit conversion part. In FIG. 6(*a*) and FIG. 6(*b*), FIG. 6(*a*) indicates a position of the work 34, and FIG. 6(*b*) indicates conversion of the position of the work 34 into a pulse position of a pulse.

First, the determining of the counting range by the counting range determining part 132 is illustrated.

The counting range determining part 132 reads a rotational speed N of the work 34 stored in the memory 12 as a parameter, and determines the rotational speed N as a correction value. The counting range determining part 132 calculates a quantity Pc of conversion pulses by using the following formula based on a rotational speed M of the motor 31, a rotational speed N of the work 34, a prescribed quantity Pr of pulses, and the correction value that are stored in the memory 12 as parameters, and stores the quantity Pc in the memory 12.

$$Pc=Pr\times(M/N)\times N=M\times Pr$$

The counting range determining part 132 instructs the quantity Pc of conversion pulses to the counter part 21 by means of the communication processing part 14, and sets a new counting range of the instruction position counter 21a and the feedback counter 21b for the quantity Pc of conversion pulses. The counter part 21 accepts the instruction, and sets a counting range of the instruction position counter 21a and the feedback counter 21b as the quantity Pc of conversion pulses.

Hence, the instruction position counter 21a and the feedback counter 21b are continuously counted until a counting value reaches the quantity Pc of conversion pulses, and restores the counting value to 0.

Here, a set example of a specific counting range is illustrated. In the set example of the counting range, the following parameters are used.

A prescribed quantity Pr of pulses: 10000 pulses
A counting upper limit value: 360°
A counting lower limit value: 0°
A rotational speed N of the work 34: 3
A rotational speed M of the motor 31: 5

Based on the parameters, the quantity Pc of conversion pulses is calculated according to the following formula.

$$Pc=10000\times(5/3)\times 3=50000 \text{ (pulses)}$$

In the set example of the counting range, actually, as shown in FIG. 5(b), the motor 31 rotates for 5 turns, and relatively, as shown in FIG. 5(a), the work 34 rotates for 3 turns. Moreover, as shown in FIG. 5(c), as a pulse position using the pulse quantity to indicate a rotation position of the work 34, 50000 pulses of 3 turns rotated by the work 34 are obtained by counting of the instruction position counter 21a and the feedback counter 21b. In his way, the quantity Pc of conversion pulses is an integer. Therefore, when a counting value is switched from an upper limit value of the counting range to a lower limit value, an error accumulation generated in the past technology and removed of a small numerical value is not generated. Hence, an assumed position of the work 34 based on the quantity Pc of conversion pulses is also indicated as shown in FIG. 5(a), and there is no deviation between the assumed position of the work 34 and an actual position of the work 34.

The following illustrates an unit conversion action performed by the unit conversion 131 on the instruction position and the current position.

Here, an example of converting units using the parameters is illustrated.

When a unit of the instruction position is converted, first, as shown in FIG. 6(a) and FIG. 6(b), the range amplification part 131a amplifies an angle range that has an upper limit of 360° and that is of 3 turns rotated by the work 34 to 3 times (3×360°=1080°) of the angle range, and amplifies a range of the pulse quantity that has an upper limit of 10000 pulses and that is of 5 turns rotated by the motor 31 to 5 times (5×Pr) of the range. Moreover, the range amplification part 131a converts the instruction position input from the motion control part 11 into a corresponding value in an amplified angle range.

The conversion processing part 131b converts, as stated above, the instruction position that is indicated by a converted angle as shown in FIG. 6(b) into a corresponding value in an amplified range of the pulse quantity. Further, the range narrowing part 131c narrows the amplified range of the quantity pulses, as stated above, to a range before the amplification.

When a unit of the current position is converted, first, similar to the situation of converting the unit of the instruction position, the range amplification part 131a amplifies an angle range of 3 turns rotated by the work 34 into 3 times of the range, and amplifies a range of the pulse quantity of 5 turns rotated by the motor 31 to 5 times of the range. Moreover, the range amplification part 131a converts the current position input from the servo driver 2 into a corresponding value in an amplified angle range.

The conversion processing part 131b converts, as stated above, the converted current position indicated by the pulse quantity as shown in FIG. 6(a) into a corresponding value in an amplified angle range. Further, the range narrowing part 131c narrows the amplified angle range, as stated above, to a range before the amplification.

As stated above, a value of the convert unit of the instruction position is a reduction ratio. Therefore, a small numerical value may be included. For example, when the instruction position is 2 turns rotated, in the unit conversion example, 720° is converted into 33333.33333 . . . pulses. The unit conversion part 131 removes the small numerical value of the instruction position and provides the value to the servo driver 2. When the servo driver 2 drives, based on the provided instruction position, the motor 31 so as to rotate the work 34, a current position of 3 rotation turns detected by the feedback counter 21b is 33333 pulses. Therefore, a deviation is generated relative to the 33333.33333 . . . pulses in the controller 1.

However, because the counting range is prescribed as an integral quantity Pc of conversion pulses, not as stated above, an error of removing the small numerical value is not accumulated, and the error does not exceed 1. The pulse quantity processed at a receiving side (the servo driver 2) is an integral unit. Therefore, the deviation may be an error that always exists.

Relatively, in a history counting range, an error of 0.6666 . . . is generated for each turn. Therefore, an error of 1.3333 . . . exceeding 1 is generated during 2 turns of rotation.

<Effects of the Controller for Correction of the Counting Range>

The controller 1 in the present implementation manner includes a counting range determining part 132, and the counting range determining part 132 determines a counting range of an instruction position counter 21a for counting a pulse quantity. The counting range determining part 132 multiples a prescribed pulse quantity Pr of each rotation of the motor 31 by a reciprocal of the reduction ratio (N/M) and a correction value, and determines the correction value which enables a multiplication result to be an integer.

Hence, the counting range of the instruction position counter 21a and the feedback counter 21b is set as an integral quantity Pc of conversion pulses. Therefore, as stated above, when the counting range is switched from an upper limit value to a lower limit value, an error of a small numerical value is not generated. Therefore, an accumulation of the error is not accumulated on a current position. Therefore, a position of the rotator actually driven is consistent with a position of the work that is set according to the instruction position. Moreover, not as that of a past controller, a management correction processing is not required to be performed on a quantity of mantissa pulses of the numerical value. Moreover, when a rotary encoder 32 is an absolute position encoder, because the pulse quantity of the counting range is used to manage the current position, when a power supply is cut off, not keeping additional information such as accumulative data of the mantissa may reduce a data amount kept by the memory when the power supply is cut off. Therefore, a simple structure can be used to precisely control the work position.

Moreover, the counting range determining part 132 determines the rotational speed N of the work 34 as a correction value. Hence, a process of determining the correction value is simple.

<Embodiments by Means of Software>

Control blocks (especially a motion control part 11, a unit conversion management part 13, and a communication processing part 14) of a controller 1 may be implemented by a logic circuit (hardware) formed in an integrated circuit (an IC chip), and may be also implemented by using a central processing unit (CPU) by way of software.

Under a latter condition, the controller 1 includes software for implementing functions of various parts, that is, a CPU controlling program commands, a Read Only Memory (ROM) or a storage apparatus (called "recording media") that can be read by a computer (or the CPU) and that records the program and various data, and a Random Access Memory (RAM) extending the program. Moreover, the computer (or the CPU) reads form the recoding medium and executes the program, so as to achieve the objective of the present invention. As the recoding medium, "a non-temporary tangible medium" may be used, for example, a tape, a disk, a card, a semiconductor memory, and a programmable logic circuit may be used. Moreover, the program may be provided to the computer by using any transmission medium (a communication network or a broadcast wave) that can transmit the program. In addition, the present invention can be implemented by a form of a data signal that specifies the program by using electronic transmission and that is embedded into carrier.

[Attachment]

The present invention is not limited to the embodiments, and various changes can be made in scopes shown in the claims. Embodiments obtained by appropriately combining technical components that are respectively disclosed in different embodiments are included in the technical scope of the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A control apparatus, configured to send a pulse used to control rotation of a rotator to a driver, wherein the rotator is rotated by a motor according to a reduction ratio as prescribed of a decelerator in which the motor is driven by the driver using a pulse quantity of the pulse for indicating an instruction position, the control apparatus comprising:
a processor configured to:
determine a counting range of a counter for counting the pulse quantity; and
multiply a prescribed pulse quantity for each rotation turn of the motor by a reciprocal of the reduction ratio and a correction value, and determine the correction value which enables a multiplication result to be an integer.

2. The control apparatus according to claim 1, wherein the decelerator is a gear pair with the reduction ratio being N/M, the gear pair enabling the rotator to rotate for integer N turns relative to the motor rotating for integer M turns; and
the processor is further configured to determine a rotational speed N of the rotator as the correction value.

3. The control apparatus according to claim 1, wherein the processor is further configured to use a positive integer as a multiplier, multiply the multiplier sequentially increasing from 1 by a multiplicative value of the prescribed pulse quantity and the reciprocal of the reduction ratio, and determine the multiplier multiplying the multiplicative value as the correction value when a multiplication result is an integer.

4. A control program, configured to use a computer as the control apparatus according to claim 1 to implement functions, wherein the control program is configured to causes the computer to serve as all parts to implement functions.

5. A recording medium, wherein the recording medium records the control program according to claim 4 and is readable by the computer.

6. The control apparatus according to claim 1, wherein the decelerator is a gear pair with the reduction ratio being N/M, the gear pair enabling the rotator to rotate for integer N turns relative to the motor rotating for integer M turns; and
the counting range determining circuit further determines a rotational speed N of the rotator as the correction value.

7. The control apparatus according to claim 1, wherein the counting range determining circuit further uses a positive integer as a multiplier, multiplies the multiplier sequentially increasing from 1 by a multiplicative value of the prescribed pulse quantity and the reciprocal of the reduction ratio, and determines the multiplier multiplying the multiplicative value as the correction value when a multiplication result is an integer.

8. A control apparatus, configured to send a pulse used to control rotation of a rotator to a driver, wherein the rotator is rotated by a motor according to a reduction ratio as prescribed of a decelerator in which the motor is driven by the driver using a pulse quantity of the pulse for indicating an instruction position, the control apparatus comprising:
a counting range determining circuit, configured to:
determine a counting range of a counter for counting the pulse quantity; and
multiply a prescribed pulse quantity for each rotation turn of the motor by a reciprocal of the reduction ratio and a correction value, and determine the correction value which enables a multiplication result to be an integer.

* * * * *